Patented Aug. 12, 1930

1,772,652

UNITED STATES PATENT OFFICE

ALFRED H. WHITE, OF ANN ARBOR, MICHIGAN

PROCESS OF SYNTHESIZING METHANE FROM GASES

No Drawing.    Application filed October 5, 1925.  Serial No. 60,684.

This invention relates to a process of synthesizing methane from gases containing carbon monoxide and hydrogen, and more particularly to a process wherein such gases are contacted at an elevated temperature with solid material capable of facilitating the reaction whereby methane is formed.

This invention is useful in increasing the unit heating value and improving the flame characteristics of many industrial gases containing carbon monoxide and hydrogen, and for illustrative purposes, I describe its application to blue water gas as one example of an industrial gas suitable for the synthesis of methane in accordance with the process of my invention.

Blue water gas consists mainly of carbon monoxide and hydrogen with lesser amounts of carbon dioxide and nitrogen and small amounts of sulphur compounds and hydrocarbons. The crude hot blue water gas frequently contains a rather large percentage of steam in addition to the constituents mentioned. This blue water gas has a heating value of about 300 British thermal units per cubic foot and is, therefore, unsuited for distribution as city gas where the heating value must usually be over 500 British thermal units per cubic foot.

Various attempts have been made to convert the constituents of the blue water gas to methane and among other instances I may cite British Patent 12,461 issued in 1902 to Elworthy and Williamson, and French Patent 355,900 issued to Sebatier in 1905. Both of these inventors passed a mixture of carbon monoxide and hydrogen over a nickel catalyst at temperatures of 250° to 500° C. Various equations may be written to express the possible reactions which take place between the hydrogen, carbon monoxide, carbon dioxide and water vapor of the blue water gas but the following reaction is accepted as one of the principal ones.

$$2CO + 2H_2 = CH_4 + CO_2$$

This reaction does not proceed readily in the right hand direction without a catalyst and nickel catalysts have been prepared in various ways. A common way has been to impregnate pumice or similar inert porous material with nickel nitrate, dry, ignite, and reduce the finely divided oxide thus formed to metallic nickel.

I propose to use an active base containing an oxide such as lime or magnesia as a support for the catalyst so that the $CO_2$ will become combined in the form of carbonate as rapidly as it is formed and thus allow the reaction to proceed towards the right more completely. After the oxide which forms the base of the active mass has become converted to carbonate, it may be regenerated by heating to a temperature high enough to dissociate the carbonate and regenerate the oxide, when, after reduction of nickel oxide formed, the catalyst is again ready for use and absorption of $CO_2$ as before.

As an example of the manufacture of a catalyst suitable for my process, I set forth the following description: About 52 parts of a calcined magnesite are intimately mixed, in the dry state, with about 11 parts of a binder such as clay kaolin, cement, etc., and to this pulverized mixture is added a solution of 13 parts of nickel nitrate in 24 parts of water. After thoroughly mixing and working these materials, I obtain a semiplastic mass which may be formed into any desired shape—as pellets, briquets, cubes, and the like—which may then be dried and heated to a temperature sufficient to decompose the magnesium carbonate contained therein, and may be treated in any convenient manner, such as heating in a current of hydrogen gas or in a gaseous mixture of carbon monoxide and hydrogen, whereby reduction of the nickel nitrate to metallic nickel is effected.

I do not wish to restrict my process to any particular type of apparatus. It may be carried out in any suitable apparatus in which is provided (1) a chamber, or chambers, for containing and heating the oxide-catalyst, through which a gaseous mixture containing carbon monoxide and hydrogen may be passed so as to bring the gas into intimate contact with the heated catalyst. There may be provided (2) a condenser or heat interchanger or other device for lowering the temperature of the gaseous mixture leaving the last of the catalyst-containing chambers so as to remove a part, at least, of the water vapor contained therein, and further there may be provided (3) suitable equipment for collecting, holding and storing the gaseous products derived from my process.

In citing a typical example of the mode of operation of my process, it is understood that I do not restrict myself to the set of conditions stated inasmuch as my process enables operations to be carried out under a diversity of conditions of temperature, pressure, rate of gas flow, etc.

One typical mode of operation of the process heretofore described is:

The gaseous mixture, containing carbon monoxide and hydrogen, which may be preheated to a temperature approximately the same as that at which the catalyst is maintained is led into the chamber containing the reduced, decarbonated catalyst material and the gases passed into intimate contact with the catalyst heated to a temperature which is favorable to the formation of methane and carbon dioxide and at which carbon dioxide reacts with the decarbonated catalyst to convert the oxide into a carbonate. These temperatures lie within the range of 450° F. to 1400° F. The particular temperature within this general range at which the catalyst is maintained will vary for different catalysts, different gas compositions, etc. For example, the temperature at which calcium carbonate is stable when in contact with a gas containing a given concentration of carbon dioxide is well known, and in operating with a catalyst containing calcium oxide the temperature employed will be one within the above range (450° F. to 1400° F.) at which calcium carbonate is stable under the other conditions of operation. In general, I have found that a calcium oxide catalyst may be used to advantage at about 750° F. The rate of flow of the gases may be varied within wide limits, so as to give any desired length of time for contact between gases and catalyst. The gases may be passed through the catalyst under positive pressure, that is be forced in or blown into the chamber containing the catalyst, but it is understood that my process may advantageously be carried out at approximately atmospheric pressure or a pressure only slightly above atmospheric.

Following its passage thru one or more chambers containing the heated catalyst the gaseous products are removed from the system, being collected and stored in any convenient manner, or if desired the gaseous products may be mixed with the original gas containing carbon monoxide and hydrogen and again passed over the heated catalyst until the degree of enrichment deemed favorable has been secured.

I further state that, as an example of my treatment of spent or carbonated catalyst, the following mode of procedure is typical though I do not wish to restrict the process exclusively to operations described.

After the catalyst material has been used as set forth above, in converting carbon monoxide to methane and carbon dioxide, and has absorbed a considerable amount of the carbon dioxide formed, the catalyst may be heated to a temperature at which dissociation of the carbonate is virtually complete, e. g., for the catalyst described in an example above, a temperature of 960° to 1100° F., while a current of air, or a current of other gases is passed over it. The catalyst may then be reduced by heating in a current of hydrogen, or in a gaseous mixture containing hydrogen, or carbon monoxide, or both, at a temperature below 750° F. as during the manufacture of catalytic material described above.

As a further illustration of how my invention may be applied, the following method of operation may be used in connection with a water gas plant of the usual present construction. Two additional chambers for methane conversion are added to the present series of three, which latter series consists of carburetor, generator and superheater. These new chambers are to be filled with the oxide mass and connected in parallel after the superheater. During the process of blasting, the blast gases leaving the superheater are passed through the No. 1 methane converter to heat it hot enough to dissociate the carbonates and drive off $CO_2$. This No. 1 methane converter will now be hotter than desirable for synthesis of methane and will be cooled, preferably with the help of a stream of cooler gas or steam, while the No. 2 methane converter is in operation, forming methane from the blue gas made in the subsequent run in the usual cycle. During the next blasting process, the No. 2 converter will be heated to decompose the carbonate, and the No. 1 converter will be used to synthesize methane during the following run. In this way the two converters are used alternately, and the raw blue gas is converted into methane without auxiliary coolers or heat interchangers.

Although I have cited the use of nickel as a catalyst, other catalysts, which will promote the synthesis of methane, may be, of course, used, and although I have cited lime and magnesia as the base on which the catalyst is distributed, any other oxides capable of forming carbonates at the temperature of the formation of methane may be used, and although it is frequently convenient commercially to regenerate the base by raising the temperature to dissociate the carbonate, I do not restrict myself to this method of operation.

Methane is the principal hydrocarbon formed by this method of synthesis by ethylene, ethane and perhaps other hydrocarbons are formed in minor amounts.

The use of an oxide such as lime or magnesia is also useful in protecting the catalyst from poisonous effects of compounds of sulphur which by preference react with the lime or magnesia rather than with the catalyst. Even if the catalyst is poisoned in the layers of oxide which first come in contact with the impure gas, the sulphur compounds will be removed from the gas by these first layers of oxide and combined as solid sulphur-containing compounds, and the bulk of the catalyst will be protected and remain active. These solid sulphur compounds will be decomposed during the regeneration of the oxides, preferably with the aid of a stream of carbon dioxide, steam, or hydrogen passing through the mass and both the catalyst and oxides will thereby be freed of poisonous sulphur compounds and will again become active.

A catalyst is useful in accelerating the rate of reaction, but the presence of lime, magnesia, or other oxides capable of forming carbonate at the temperature of the formation of methane, will promote the synthesis of methane, since it removes the carbon dioxide from the gas phase as soon as it is formed, and I may, therefore, use such oxides or a mixture of oxides, without any other catalyst, to promote the reaction.

An added advantage in my process is due to the heat evolved when the carbon dioxide formed simultaneously with the methane reacts with the oxide to form carbonate. This heat of reaction prevents the converter from cooling off during the synthesis of methane and even allows the use of a gas entering the methane converter at a lower temperature than is otherwise practicable for a desirable rate of formation of methane.

The reaction which I have cited between carbon monoxide and hydrogen is the principal one which occurs when methane is formed from blue water gas. However, there are other well known reactions between carbon and steam and between carbon monoxide and steam which will also give methane, and I desire to include these also as within the scope of my process. As instances of these reactions, I may cite:

$$4CO + 2H_2O \leftrightarrows CH_4 + 3CO_2$$
$$2C + 2H_2O \leftrightarrows CH_4 + CO_2$$

This last reaction is one which may be especially stimulated by my process, for the action of steam on carbon yielding methane and carbon dioxide is only slightly exothermic. If, however, the reaction takes place according to my process, the equation becomes:

$$2C + 2H_2O + CaO \leftrightarrows CaCO_3 + CH_4$$

If this reaction proceeds completely to the right 48,450 calories of heat are evolved for each gram molecule of methane formed while without the lime, only 8,580 calories of heat are evolved.

The gas does not have to be freed from suspended carbon hydrocarbons, or sulphur compounds, for even if the catalytic material becomes coated with carbon and fouled by sulphur compounds, both of these materials will be removed during the regeneration of the oxides.

Although I have discussed mainly the application of my process to blue water gas, it is evident that it may also be applied to any industrial gas which contains carbon monoxide and hydrogen, or carbon monoxide and steam, such as producer or coke oven gas. Blast furnace gas which consists mainly of carbon monoxide and nitrogen may have steam added to it and then be treated by my process.

It will be obvious that various changes may be made in the practising of my invention without departing from the spirit thereof and it is my intention to cover by my claims such changes as may be included within the scope of my invention.

What I claim is:

1. The process of synthesizing methane from a mixture of gases containing carbon monoxide and hydrogen, which comprises contacting at a temperature above 450° F. and below 1400° F. said mixture of gases with a material comprising nickel distributed on solid masses consisting largely of magnesium oxide.

2. The process of synthesizing methane from a mixture of gases containing carbon monoxide and hydrogen, which comprises contacting at a temperature above 450° F. and below 1400° F. said mixture of gases with nickel distributed on solid masses consisting largely of magnesium oxide, whereby methane is formed and said oxide forms a carbonate material, then raising the temperature of the solid masses containing carbonate to a temperature at which carbon dioxide is driven off and the oxide regenerated, then lowering the temperature to a point where the oxide is again capable of forming carbonate and synthesizing methane from a gaseous mixture containing hydrogen and carbon monoxide as in the first instance.

3. The process of synthesizing methane from a mixture of gases containing carbon monoxide, hydrogen, and sulfur compounds, which comprises contacting at a temperature above 450° F. and below 1400° F. said mixture of gases with nickel distributed on solid masses consisting largely of magnesium oxide whereby to form carbonates and sulfides.

4. The process of synthesizing methane from a mixture of gases containing carbon monoxide, hydrogen, and sulfur compounds, which comprises contacting at a temperature above 450° F. and below 1400° F. said mixture of gases with nickel distributed on solid masses consisting largely of magnesium oxide, whereby methane is formed and said oxide forms a carbonate and sulfide, then raising the temperature of the solid masses containing carbonate and sulfide to a temperature at which said carbonate and sulfide dissociate and the oxide is regenerated, then lowering the temperature to a point where the oxide is again capable of forming carbonate and sulfide and synthesizing methane from a gaseous mixture containing hydrogen, carbon monoxide, and sulfur compounds, as in the first instance.

5. The process of preparing a methane containing gas from combustible gases containing oxides of carbon and hydrogen which consists in causing the gases to contact with a nickel catalyst supported on a base composed mainly of magnesium oxide at tempertures between 450° and 1100° F. and to react in contact with this catalyst until at least one-quarter of the carbon initially present as oxide shall have been converted to methane.

ALFRED H. WHITE.